United States Patent [19]

Jonsson

[11] 4,194,974

[45] Mar. 25, 1980

[54] PRESSURE MONITORING DEVICE

[75] Inventor: Ulf L. P. Jonsson, Furulund, Sweden

[73] Assignee: Gambro AB, Lund, Sweden

[21] Appl. No.: 857,823

[22] Filed: Dec. 5, 1977

[30] Foreign Application Priority Data

Dec. 3, 1976 [SE] Sweden ................................ 7613577

[51] Int. Cl.$^2$ ................................................ B01D 31/00

[52] U.S. Cl. ........................................ 210/90; 116/70; 128/214 E; 200/61.6; 200/76; 200/81 H; 200/83 P; 200/330; 200/334; 210/321 B

[58] Field of Search ........................ 210/22, 40, 321 B; 128/214-E; 116/70; 200/81.5, 83 H, 83 P, 330, 334, 61.6, 76, 78, 81 R, 81 H, 82 A, 82 C, 82 R

[56] References Cited

U.S. PATENT DOCUMENTS

| | | | |
|---|---|---|---|
| 2,975,258 | 3/1961 | Higginbottom | 200/330 |
| 4,006,083 | 2/1977 | Westervelt et al. | 210/90 |
| 4,007,734 | 2/1977 | Peters | 116/70 X |
| 4,077,882 | 3/1978 | Gangemi | 210/90 |

*Primary Examiner*—Frank A. Spear

*Attorney, Agent, or Firm*—Lerner, David, Littenberg & Samuel

[57] ABSTRACT

A pressure monitoring device is disclosed which is adapted to couple a source of fluid with a tripping device. The tripping device includes a tripping switch movable between a first position in which a tripping signal is generated and a second position in which a tripping signal is not generated, and biasing means for biasing the tripping switch into the first position. The pressure monitoring device comprises pressure transmission means which is operable in a first mode and in a second mode, and coupling means having a first position and a second position. The pressure transmission means when operating in the first mode is responsive to the pressure of the fluid being monitored and when operating in the second mode is independent of the pressure of the fluid. The coupling means is operatively associated with the pressure transmission means and the tripping device for coupling the pressure transmission means to the tripping device. The coupling means transmits a pressure signal proportional to the pressure of the fluid to the tripping switch when the coupling means is in the first position and the pressure transmission means is operating in the first mode whereby the tripping device generates a tripping signal when the pressure of the fluid passes a predetermined limit. Further, the coupling means forces the tripping switch into the second position independent of the pressure of the fluid when the coupling means is in the second position.

24 Claims, 2 Drawing Figures

PRESSURE MONITORING DEVICE

BACKGROUND OF THE INVENTION

The present invention relates to a pressure monitoring device and more particularly to a pressure monitoring device which is adapted to couple a source of fluid with a tripping device in such a manner that a tripping signal is generated when the pressure of the fluid being monitored passes a certain predetermined limit.

It is often desirable to couple pressure monitoring devices to fluid systems employing pressurized fluids in order to monitor the fluid pressure and generate a signal if the pressure passes predetermined limits, i.e., goes above a high pressure limit or below a low pressure limit. The signal generated when the pressure passes the predetermined limit may for example be an alarm signal to actuate an alarming device such as a light or buzzer, or the signal may be used to actuate a device to adjust the pressure of the fluid or even shut down the system. In such systems employing pressure monitoring devices, it may also be desirable to prevent generation of the tripping signal when the monitoring device is bypassed and/or disconnected from the fluid system, in order not to generate a "false" tripping signal.

For example, pressure monitoring devices are useful in dialysis systems to monitor the pressure of the blood being dialized and to generate a tripping signal in the event that the blood pressure falls below a certain limit. Further, it may be desirable in such systems that the tripping signal not be generated when the blood lines are disconnected from the dialysis system and/or patient.

SUMMARY OF THE INVENTION

In accordance with the present invention, there is provided a pressure monitoring device adapted to couple a source of fluid with a tripping device in which the tripping device includes a tripping switch movable between the first position in which a tripping signal is generated and a second position in which a tripping signal is not generated, and biasing means biasing the tripping switch into the first position. The pressure monitoring device comprises pressure transmission means operable in a first mode and in a second mode, and coupling means having a first position and a second position. The pressure transmission means when operating in the first mode is responsive to the pressure of the fluid being monitored and when operating in the second mode is independent of the pressure of the fluid. The coupling means is operatively associated with the pressure transmission means and the tripping device for coupling the pressure transmission means to the tripping device. The coupling means transmits a pressure signal proportional to the pressure of the fluid to the tripping switch when the coupling means is in the first position and the pressure transmission means is operating in the first mode whereby the tripping device generates a tripping signal when the pressure of the fluid being monitored passes a predetermined limit. Further, the coupling means forces the tripping switch into the second position independent of the pressure of the fluid when the coupling means is in the second position.

In a preferred embodiment of the present invention, the coupling means comprises a spring device having two different operating positions. In one of the operating positions, the pressure signal is directly transmitted to the tripping device independent of any biasing force of the spring device, and in the other operating position, the spring device provides the sole pressure on the tripping switch independent of the pressure of the fluid.

In a still further preferred embodiment, the spring device comprises a plate spring, the ends of which are held a distance apart less than the length of the plate spring so that the plate spring is bowed in each of the two operating positions.

These and other features of the present invention will now be described with reference to the enclosed drawings in which a preferred embodiment of the invention is shown.

DETAILED DESCRIPTION OF THE INVENTION

Figure 1:
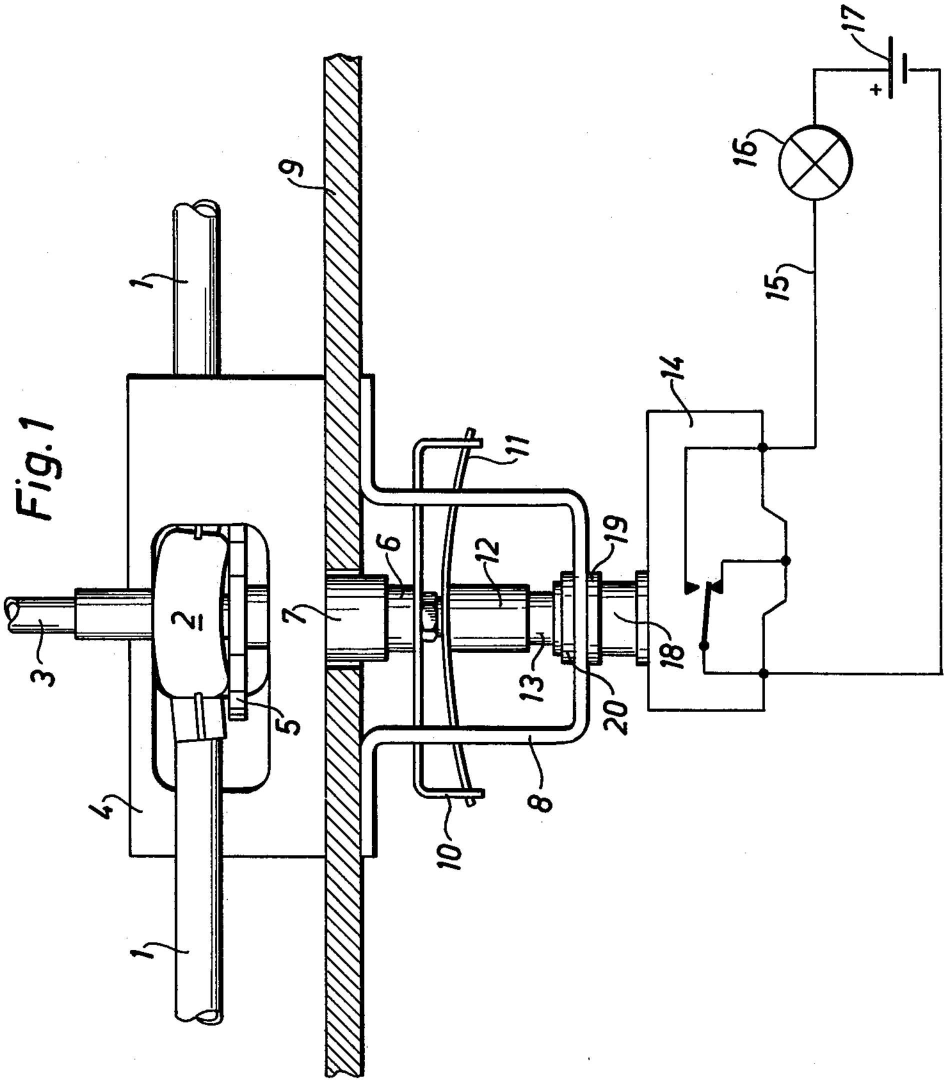
FIG. 1 shows a schematic side elevational view of the pressure monitoring device of the present invention in which the device couples a source of fluid with a tripping device.

Referring now to the drawings, there is shown in FIG. 1 a pressure monitoring device in accordance with the present invention which is arranged so that it monitors the pressure in a line 1. Line 1 may for example be a blood line in a dialysis system where it is desirable to monitor the blood pressure and to generate a tripping signal if the blood pressure falls below a certain limit. Such a dialysis system may for example be of the type shown in U.S. Patent Application Ser. Nos. 841,898 and 841,899 both filed on Oct. 13, 1977. To facilitate the monitoring, the line 1 is provided with a flexible monitoring pad 2. To this monitoring pad 2 is connected a further line 3 which is intended for the calibration of the pressure monitoring device in order to aid in adjustment of the predetermined pressure limit at which a tripping signal will be generated. This line 3 may therefore be connected or connectable to a conventional pressure gauge which indicates the actual pressure in the line 1.

When the pressure monitoring device is to be utilized for the detecting or monitoring of the pressure in the line 1, the line 1 with the pad 2 and the connecting line 3 are introduced into a housing 4 which contains an internal sensing element 5. In the embodiment shown this sensing element has the form of a wheel which is manually adjustable in relation to a transmission shaft 6. This adjustability is achieved in any suitable manner, not shown on the drawing, e.g. in that the wheel is threaded on or in the transmission shaft 6. The shaft 6 passes through a bushing 7 which is permanently fixed to the housing 4.

The housing 4 together with a bracket 8 is attached to a fixed machine element 9 which may consist for example of the wall of a control unit. At its extreme end the transmission shaft 6 carries a movable bracket 10. This bracket is U-shaped and carries between the ends of its side pieces a plate spring 11. This plate spring in turn carries a pressure transmission element 12 which is adapted so that it acts upon a movable spring-loaded actuating element 13 of a tripping device, such as for example, a conventional microswitch 14.

Figure 2:
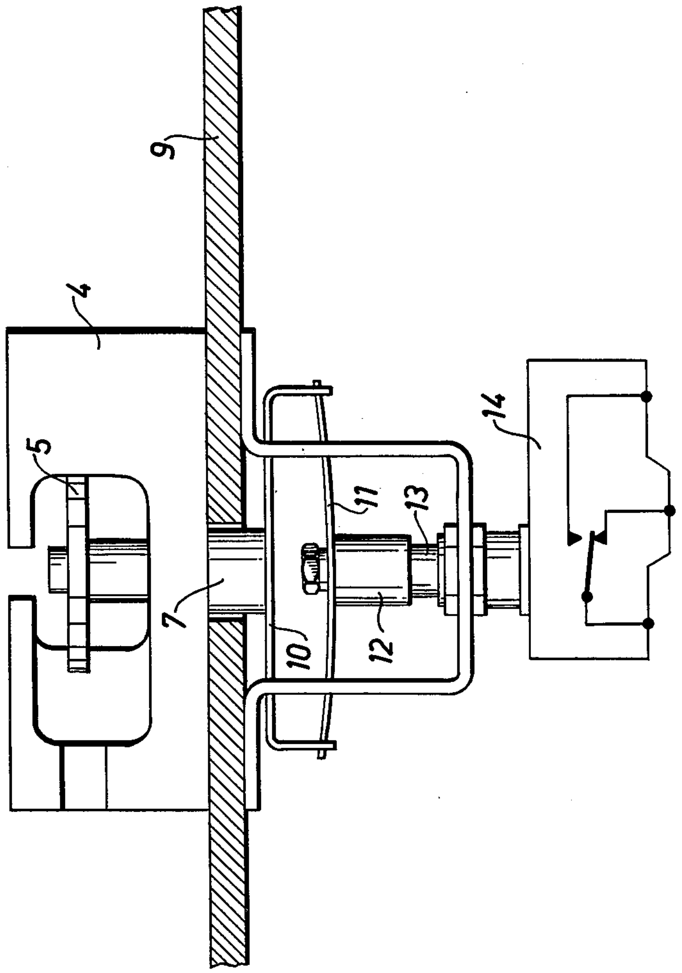
FIG. 2 is a schematic side elevational view of the pressure monitoring device of the present invention, similar to that depicted in FIG. 1, but showing the device in a different position.

As shown, the ends of the plate spring 11 are fixed to the side pieces of U-shaped bracket 10 so that the ends of the plate spring 11 are separated or spaced a distance less then the total length of the plate spring 11. Thus, as is apparent, the plate spring 11 is movable between two positions—a first position in which it is bowed or flexed upwardly toward transmission shaft 6 (as shown in FIG. 1) and a second position in which it is bowed or flexed downwardly toward the spring loaded actuating element 13 of microswitch 14 (as shown in FIG. 2).

The microswitch 14 may be of any suitable type, and therefore its inner mechanical construction is not shown in detail. It is important only that its actuating element 13 should be pressed in against the action of a spring force. However, FIG. 1 does show a diagramatic representation of how microswitch 14 can be used to activate an alarm lamp or light 16. As shown, microswitch 14 obtains its energy from a source 17 and will generate a signal when the spring-loaded actuating element 13 is raised or moved upwards an amount which is sufficient to complete the circuit via line 15, alarm lamp 16 and source 17. Naturally, the signal generated by microswitch 14 can also be used for purposes other than for lighting an alarm lamp 16. For example, the signal, besides or in addition to activating the alarm 16, may also activate means for adjusting the pressure in line 1, e.g. by starting a pump, or opening or closing a valve in line 1.

The microswitch 14 is fixed to the bracket 8 with the help of a fixed stud 18 and nuts 19 and 20. Thus, in the position shown, a pressure signal proportional to the pressure of the fluid is transmitted from the pad 2 via the sensing element 5, the pressure transmission shaft 6, the plate spring 11, and the pressure transmission element 12 to the movable actuating element 13 of the microswitch 14. It is to be noted that when the spring 11 is in the position shown in FIG. 1, i.e., flexed toward the pressure transmission shaft 6, the spring pressure of the plate spring 11 does not affect the loading of the actuating element 13.

It is to be noted that by manually adjusting the position of the sensing element 5 relative to the shaft 6, the pressure limit at which the microswitch 14 trips can be readily varied. For example, if the wheel 5 is raised, relative to shaft 6, the distance between the top of the wheel 5 and the bottom of the pressure transmission element 12 is increased. Thus, wheel 5 will have to move upwards a greater distance within the housing 4 before the spring loaded actuating element 13 will complete the circuit 15, 16, 17. This in turn means that a lower fluid pressure is required to trip microswitch 14. Similarly, lowering of the wheel 5 relative to the shaft 6 will increase the value of the pressure at which the microswitch 14 is tripped. Further, it is apparent that use of a pressure gauge connected to line 3 which provides a visual indication of the pressure in line 1 may be useful in setting this predetermined limit at which microswitch 14 will trip.

If the pressure monitoring device is to be by-passed, such as for example, when the blood line is to be disconnected from the dialysis system and/or the patient, the tube 1, its pad 2 and its connecting line 3 may be removed from the housing 4. This is shown in FIG. 2. Subsequently, the wheel or sensing element 5 is gripped and moved out manually to the position shown in FIG. 2 and the plate spring 11 flipped or snapped over to its other position as shown in FIG. 2. That is, the plate spring 11 is moved to its second position in which it is bowed toward the spring-loaded actuating element 13.

In this position, the bracket 10 affixed to transmission shaft 6 is pressed against the fixed bushing 7 and the pressure transmission element 12 is pressed against the actuating element 13 to maintain the actuating element 13 in its fully recessed or retracted position to prevent any signal from being emitted from the circuit 15, 16, 17. As can be appreciated, this is achieved by making the pressure exerted by the plate spring 11 sufficient to overcome the internal spring force of the microswitch 14. Thus, when in the position shown in FIG. 2, the microswitch 14 is only influenced by the pressure exerted by plate spring 11, and not by the pressure of the fluid. This is desirable in order to prevent generation of any "false" tripping signals when the pressure monitoring device is being by-passed. That is, when the fluid line 1 and pad 2 have been removed from the housing 4, the position of the plate spring 11 as shown in FIG. 2 will prevent a misunderstanding regarding an alarm condition since no tripping signal can be generated.

Further, it should be appreciated that, when the tubes are introduced into the housing 4, the system may be automatically returned to the position shown in FIG. 1 and activated so that the circuit 15, 16, 17 is closed if the pressure in the line 1 drops below a predetermined value which can be set by means of the wheel 5.

Naturally, the invention is not limited exclusively to the embodiment described above, but can be varied within the scope of the following claims. It will be obvious for example to those versed in the art, that the plate spring shown can be substituted by other spring devices which are moved between two different operating positions. Such a system may be constructed for example with the help of a lever mechanism and optional springs. It will probably be found, however, that the simple plate spring shown represents the most convenient arrangement.

What is claimed is:

1. A pressure monitoring device adapted to couple a pressurized fluid conduit with a tripping device, said tripping device including a tripping switch movable between a first position in which a tripping signal is generated and a second position in which a tripping signal is not generated, and biasing means for biasing said tripping switch into said first position, the pressure monitoring device comprising:

pressure transmission means operable in a first mode and in a second mode, said pressure transmission means when operating in said first mode being responsive to the pressure of the fluid in the pressurized fluid conduit, and when operating in said second mode being independent of the pressure of the fluid in the pressurized fluid conduit; and coupling means operatively associated with said pressure transmission means and said tripping device for coupling said pressure transmission means to said tripping device, said coupling means being positionable in a first position and in a second position, said coupling means transmitting a pressure signal proportional to the pressure of the fluid in the pressurized fluid conduit to said tripping switch when said coupling means is positioned in said first position and said pressure transmission means is operating in said first mode whereby said tripping device generates a tripping signal when the pressure of the fluid passes a predetermined limit, and said coupling means biasing said tripping switch towards said second position independent of the pressure of the fluid in the pressurized fluid conduit when said coupling means is positioned in said second position.

2. The pressure monitoring device of claim 1 wherein said pressure transmission means is movable when operating in said first mode in response to the pressure of said fluid; and wherein said coupling means comprises spring means having a first spring position and a second spring position, said spring means being interposed between said pressure transmission means and said tripping switch, and said spring means when in said first spring position directly coupling said pressure transmission means to said tripping switch so that movement of said pressure transmission means causes movement of said tripping switch, and said spring means when in said second spring position biasing said tripping switch toward said second position independent of movement of said pressure transmission means.

3. The pressure monitoring device of claim 2 wherein said spring means comprises a plate spring and spring holding means for fixably holding the ends of said plate spring at a distance apart from one another less than the length of said plate spring.

4. The pressure monitoring device of claim 3 wherein said spring holding means is fixably supported by said presssure transmission means.

5. The pressure monitoring device of claim 1 further including a housing in which said pressure transmission means is supported for relative movement with respect thereto; and wherein said pressure transmission means comprises sensing means within said housing for sensing the pressure of the fluid in the pressurized fluid conduit when said pressure transmission means is operating in said first mode, and a transmission member extending through said housing and operatively connected to said sensing means for movement with respect to said housing in response to the pressure sensed by said sensing means, the relative position of said transmission member with respect to said housing being indicative of the pressure sensed by said sensing means.

6. The pressure monitoring device of claim 5 wherein said sensing means is adjustably connected to said transmission member so as to vary the relative position between said sensing means and said transmission member to adjust said predetermined limit at which said tripping device generates said tripping signal.

7. The pressure monitoring device of claim 5 wherein said housing is adapted to receive a flexible fluid line within said housing when said pressure transmission means is operating in said first mode, and wherein said sensing means is adapted to move within said housing in response to changes in the pressure of the fluid in said flexible fluid line to in turn move said transmission member relative to said housing.

8. The pressure monitoring device of claim 7 further including pressure indication means adapted to be connected to said flexible fluid line to visually indicate the pressure of the fluid within said line, and wherein said sensing means is adjustable with respect to said transmission member, movement of said sensing member relative to said transmission member resulting in adjustment of said predetermined limit, and said indication means providing a visual indication related to said predetermined limit set by the positioning of said sensing means relative to said transmission member.

9. The pressure monitoring device of claim 5 wherein said coupling means comprises spring means having a first spring position and a second spring position, said spring means being interposed between and operatively associated with said transmission member and said tripping device, said spring means when in said first spring position directly transmitting movement of said transmission member to said tripping switch, and said spring means when in said second spring position biasing said tripping switch towards said second position independent of the position of of said transmission member.

10. A pressure monitoring and tripping device for monitoring the pressure of a fluid and for generating a signal when the pressure passes a predetermined value, said pressure monitoring and tripping device comprising:

pressure transmission means adapted to be responsive to the pressure of the fluid being monitored;

a tripping device having switch means movable between a first switch position and a second switch position, and signal generating means for generating a signal when said switch means is in said first switch position; and spring means having a first spring position and a second spring position, said spring means being interposed between said pressure transmission means and said switch means, said spring means when in said first spring position directly coupling said pressure transmission means to said switch means so that said switch means is movable between said first and second switch positions in response to the pressure of the fluid being monitored such that said switch means moves to said first switch position when the pressure of the fluid being monitored passes the predetermined value, and said spring means when in said second spring position biasing said switch means towards said second switch position, independent of the pressure sensed by said pressure transmission means so that said switch means is hindered from moving towards said first switch position.

11. The pressure monitoring device of claim 10 further including a housing in which said pressure transmission means is supported for relative movement with respect thereto; and wherein said pressure transmission means comprises sensing means within said housing for sensing the pressure of the fluid, and a transmission member extending through said housing and operatively connected to said sensing means for movement with respect to said housing in response to the pressure sensed by said sensing means, the relative position of said transmission member with respect to said housing being indicative of the pressure sensed by said sensing means.

12. The pressure monitoring device of claim 11 wherein said sensing means is adjustably connected to said transmission member so as to vary the relative position between said sensing means and said transmission member to adjust the predetermined pressure value at which said switch means moves to said first switch position.

13. The pressure monitoring device of claim 12 wherein said sensing means is a sensing element threadably connected to the end of said transmission member within said housing, the longitudinal position of said sensing element relative to said transmission member being indicative of the predetermined pressure value at which said switch means moves into said first switch position when said spring means is in said first position.

14. The pressure monitoring device of claim 10 wherein said pressure transmission means comprises a pressure transmission member acting against said switch means independent of any biasing force exerted by said spring means when said spring means is in said first position.

15. The pressure monitoring device of claim 14 wherein said spring means comprises a plate spring and spring holding means for fixably holding the ends of said plate spring at a distance apart from one another less than the length of said plate spring.

16. The pressure monitoring device of claim 15 wherein said spring holding means is carried by said pressure transmission member and wherein said plate spring carries a pressure transmission element for engaging said switch means to vary the position of said switch means in response to changes in the position of said pressure element, said pressure transmission element being in contact with said pressure transmission member when said plate spring is in said first position so that said pressure transmission member and said pressure transmission element move together in response to changes in the pressure of the fluid being monitored.

17. The pressure monitoring device of claim 16 wherein said pressure sensing element is separated from direct contact with said pressure transmission member when said plate spring is in said second position.

18. The pressure monitoring device of claim 17 wherein said plate spring when in said first position is bowed toward said pressure transmission member so that said pressure transmission element contacts said pressure transmission member, and wherein said plate spring is bowed away from said pressure transmission member when in said second position so that said pressure transmission element is separated from said pressure transmission member.

19. The pressure monitoring device of claim 17 wherein said tripping device comprises a microswitch having a spring loaded actuating element, said spring loaded actuating element being in an extended when in said first switch position and being in a retracted when in said second switch position.

20. The pressure monitoring device of claim 19 further including a housing for supporting said pressure transmission member for relative movement with respect thereto; wherein said pressure transmission means further includes sensing means within said housing operatively connected to said pressure transmission member for sensing the pressure of the fluid being monitored and for moving said pressure transmission member in response thereto; and further including support means for supporting said microswitch in fixed relationship to said housing so that said pressure transmission element carried by said plate spring depresses said spring loaded actuating element of said microswitch into said second switch position when the pressure of the fluid being monitored is greater than said predetermined pressure value, and so that said pressure transmission element permits said spring loaded element to move into said first switch position when the pressure falls below said predetermined pressure value.

21. The pressure monitoring device of claim 20 wherein the position of said sensing means relative to said pressure transmission member is adjustable so that the predetermined pressure at which said spring loaded actuating element will move into said first switch position is adjustable.

22. The pressure monitoring device of claim 21 further including gauge means in fluid communication with the fluid to be monitored to aid in adjustment of said sensing means to adjust said predetermined pressure limit.

23. The pressure monitoring device of claim 10 wherein said spring means comprises a plate spring and spring holding means for fixably holding the ends of said plate spring at a distance apart from one another less than the length of said plate spring.

24. The pressure monitoring device of claim 1 wherein said coupling means is positionable in said second position when said pressure transmission means is operable in said second mode so that said tripping device is hindered from generating a tripping signal.

* * * * *

UNITED STATES PATENT AND TRADEMARK OFFICE

CERTIFICATE OF CORRECTION

PATENT NO. : 4,194,974

DATED : March 25, 1980

INVENTOR(S) : Ulf L. P. Jonsson

It is certified that error appears in the above-identified patent and that said Letters Patent are hereby corrected as shown below:

Column 4, line 21, the word "introduced" should read --reintroduced--.

Claim 20, line 17, after "loaded" insert --actuating--.

Signed and Sealed this

***Twenty-fourth* Day of *June 1980***

[SEAL]

*Attest:*

SIDNEY A. DIAMOND

*Attesting Officer* *Commissioner of Patents and Trademarks*